United States Patent Office 2,869,078
Patented Jan. 13, 1959

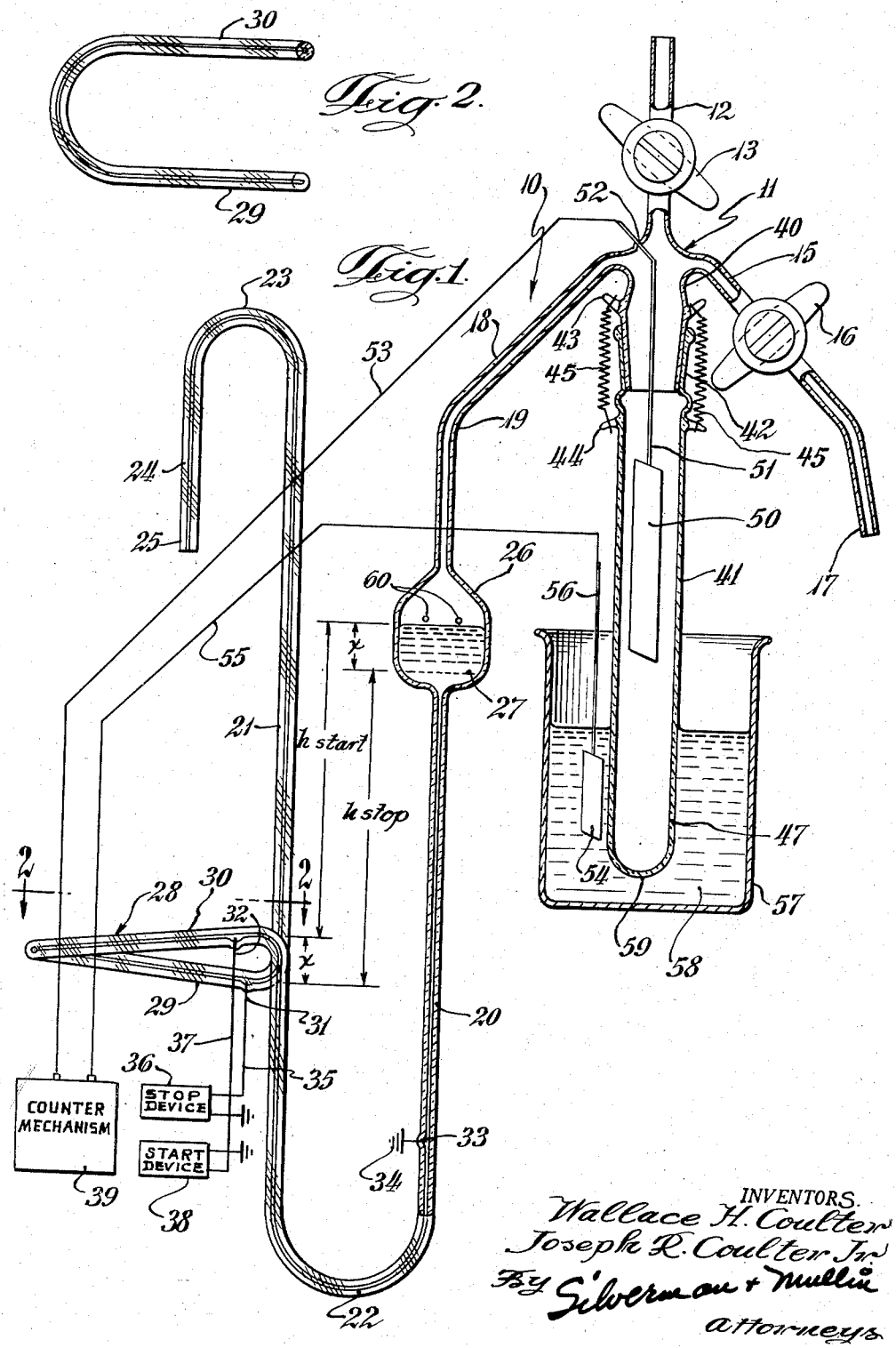

2,869,078
FLUID METERING APPARATUS

Wallace H. Coulter and Joseph R. Coulter, Jr., Chicago, Ill., assignors, by direct and mesne assignments, to Coulter Electronics, Inc., Chicago, Ill., a corporation of Illinois Application May 9, 1956, Serial No. 583,850

18 Claims. (Cl. 324—71)

This invention relates generally to fluid metering apparatus and more particularly is concerned with novel apparatus for metering a constant volume of fluid through a detecting system for ascertaining certain scientific data concerning said fluid.

In the study of particles suspended in a fluid medium, such as may be occasioned in counting blood cells or the determination of particle concentration in other body fluids, or the size distribution of particles in a suspension, it is necessary to provide some degree of control and measurement of the flow of suspension sample through the detecting system. The degree of control will materially affect the accuracy of the determination. Various detecting systems are known for making studies of this nature, such as for instance, the photoelectric cell method which utilizes the light modulating effect of particles or groups of particles in a sample suspension in a fluid stream intercepting a beam of light. Another method has been described in Patent No. 2,656,508, issued to Wallace H. Coulter on October 20, 1953, which utilizes the principle of passing the sample suspension through a constricted electrical current path, the presence of a particle in the path modulating the electrical current flow in the path to produce a detectable change in the electrical characteristics of the path.

Other methods, as well, are known, all of which involve the metering of a sample of the particle containing suspension past a scanning point in the detecting system.

Although accuracy of determination naturally is of prime importance in such a study, other advantages are very desirable. In the use of detecting systems for such studies, it is desired accurately and precisely to control and measure the flow of the sample suspension past the scanning point of the detecting system and as a corollary, to enable metering of a constant volume of the sample suspension through the detecting system. A high order of repeatability of flow of sample suspensions through the detecting system, especially of different suspensions, is particularly desirable in the interest of efficiency and economy. It is desirable also that changes in the metered volume of sample suspension due to ordinary temperature changes such as are likely to be encountered under ordinary laboratory conditions be reduced to a safe acceptable value. A further consideration, of course, is the provision of a metering device for use with such detecting systems which is economical and versatile so that same may be adapted for use with various types of detecting devices and fluid metering systems.

The principal object of the invention hereinafter disclosed is the provision of a fluid metering apparatus which will accomplish all of the desirable advantages described hereinabove, economically, conveniently, and reliably.

Another important object of the invention is to provide novel fluid metering apparatus of the character described which enables a more precise and accurate metering of a predetermined and constant volume of the fluid to be tested as it passes the scanning point of a detecting system than heretofore has been realized.

Another object of the invention is to provide a fluid metering device of the character described which includes a novel syphon and manometer system connectable to a low pressure source which enables repeated determinations to be made with substantial elimination or minimizing of effects of debris in parts of the system remote from the scanning point, air bubbles or the like which may be present in the device or adverse effects on such determinations by reason of normal elasticity of the system. An ancilliary object is to provide such a syphon and manometer system which by reason of its construction and operation serves to establish an unbalanced, substantially constant pressure system by means of which a high order of repeatability and accuracy of determination is achieved.

Another object of the invention is to provide a metering device of the character described which includes a novel syphon and manometer system having a mercury column, including a substantially constant horizontal length of the column whereby to achieve a substantially unchanging pressure differential in the system during the metering cycle, the detecting system being automatically operated while the mercury occupies said horizontal length.

Still a further object of the invention is to provide a manometer and syphon arrangement in which the automatic operation of the metering cycle is initiated by the manometer fluid successively energizing at least two electrical circuits while rising in one branch and dropping in the other, the drop in level and volume displaced in both branches being substantially equal to provide a constant pressure differential during the metering cycle.

Other objects of the invention include provision of such a metering device which is simple in principle and operation, which is very economical to manufacture and operate, and easy to service and maintain.

These and other objects of the invention will become apparent as a preferred embodiment is described in the specification and shown in the accompanying drawings. Minor variations in size, proportion, arrangement and construction of parts of the invention will occur to the skilled artisan without departing from the principles or sacrificing any of the advantages of the invention.

In the drawings:

Fig. 1 is a vertical sectional view taken through the metering device embodying the invention, portions of the device being shown diagrammatically in connection with certain well known elements with which the invention may be associated.

Fig. 2 is a sectional view taken through the syphon column of the device along the line 2—2 of Fig. 1 and in the direction indicated to show the horizontal section of said column.

Generally, the metering apparatus embodying the invention includes a combination mercury syphon and manometer having a volumetrically calibrated horizontal section which enables metering of a predetermined and constant volume of sample suspension relative to the scanning point of a detection system. Electrical contacts are provided in the horizontal or metering section which are connected to the detecting device through a starting and a stopping device. The apparatus is connectable to an external vacuum source and includes means for regulating and controlling the pressure differential which causes flow of the sample suspension relative to the scanning point of the detecting device. Auxiliary flow control means are provided for rapid filling of the apparatus with the suspension being studied remote from the scanning point. The metering apparatus is detachably connectable to a conduit having an inlet, said conduit housing a detector element which comprises the scanning point of the detecting device. Said conduit is immersible in a container having the suspension to be studied therein, the apparatus in operation causing a predetermined constant sample volume of the suspension to flow through said inlet into the conduit and relative to the said scanning point. The electrical contacts provided in the metering section are spaced apart a predetermined distance related to the volume of sample metered and are arranged to effect operation of the detecting device for the interval of time equal to the amount of time required of the constant sample volume to flow relative to said scanning point. Operation of the detecting device is therefore substantially automatic, as is the control of flow of the constant sample volume for each determination.

Referring now to the drawings, the metering device embodying the invention has been designated generally by the reference character 10. Said device is suitable for mounting in vertical operative position in an appropriate stand, it being deemed unnecessary to show a particular construction for the stand since same forms no part of the invention and is within the ordinary skill of the artisan to devise. The syphon and manometer portions of the device may be formed of a rigid conduit, such as glass or suitable plastic, either as an integral construction or in several sections appropriately joined together. The syphon and manometer portion of the device 10 includes a multi-branched hollow section 11 preferably integrally formed. The branch arm 12 of said section 11 is adapted to be connected to an external vacuum source (not shown) such as a water aspirator or other known air evacuating means. A stopcock 13 mounted in arm 12 provides a principal vacuum and sample suspension flow regulator. The branch 15 serves as an auxiliary inlet into the device 10 and includes a stopcock 16 for control purposes. The free end 17 of this branch is open and thereby constitutes an auxiliary inlet for rapid filling of the device with the sample suspension for eliminating air bubbles, flushing, etc. Although the branch arm 15 is shown as an integral member, same could also be formed of two sections held together with their adjacent ends abutting by means of a section of rubber tubing, for instance.

The branch arm 18 has been shown as a single length of glass tubing angularly disposed relative to the arm 12, however, a multiple-section construction would not be precluded. The arm 18 is bent as at 19 to provide a generally vertically arranged, substantially straight section 20 integral therewith. Section 20 is formed preferably of capillary tubing and is integral with a second vertical, substantially parallel straight capillary section 21, the sections 20 and 21 being joined by the connecting section 22 to form a U-shaped formation. The opposite end of section 21 is return bent as shown at 23 to provide a short portion 24 opening downwardly at its free end 25.

The straight section 20 is provided with an enlarged hollow portion 26 intermediate the bends 19 and 22 serving as a reservoir for the mercury 27 carried in the sections 20 and 21. The section 21 is provided with a constant length, substantially horizontal section 28 spaced below said reservoir, the bore through section 28 connecting with the bore through section 21 such that passage of mercury from section 21 through section 28 is permitted. As seen from Fig. 2, the substantially horizontal section 28 is generally U-shaped as viewed in plan, the free end of each arm 29 and 30 thereof connecting with section 21 at points vertically spaced one from the other. This is achieved by having the arms 29 and 30 angularly disposed one relative to the other, with the arm 30 arranged in a substantially horizontal plane above the horizontal plane of arm 29.

An electrical contact 31 is formed on the interior of the wall of arm 29 and an electrical contact 32 likewise is provided on the interior of the wall of arm 30. An electrical contact 33 is provided on the interior of the wall of section 20 in close proximity to bend 22 which is connected to ground as indicated at 34. The contact 31 is connected as by lead 35 to a stopping device 36 while the contact 32 is connected as by lead 37 to a starting device 38. The starting device 38 and stopping device 36 are electrically connected to a counter mechanism 39 which is part of the detecting system of the device 10.

The section 11 also includes a downwardly opening conduit 40 adapted to be removably received in the open end of a conduit such as test tube 41 forming a standard ground glass juncture as indicated at 42. The conduit 40 and tube 41 may each be provided with a pair of hooks 43 and 44 which in cooperation with springs 45, 45 engaged between said hooks 43 and 44 will maintain the conduit 40 engaged in the open end of the tube 41. Adjacent the bottom 46 of said tube 41 is provided a small aperture 47 constituting the inlet through which fluid may be caused to flow to the interior of the said tube.

The scanning element of the detecting system of the apparatus is provided by means of the aperture 47 which modulates current flow to electrode 50 in the form of a strip of platinum foil suspended by means of a platinum wire 51 on the interior of tube 41, the wire 51 being passed through the section 11 as indicated at 52 and then connected as by lead 53 to the counter mechanism 39 (which may include amplifiers, etc.). An external platinum electrode 54 connected as by lead 55 also to the counter 39 is arranged to be suspended as by wire 56 into a vessel, such as beaker 57, in which the sample suspension 58 is contained. In making the study of the sample suspension 58, tube 41 is inserted into the suspension 58. The bottom end of the electrode 54 is suspended in the suspension with its bottom end extending substantially to the closed bottom end 59 of the tube 41 and serves to make contact with the sample when the tube is positioned with the aperture 47 well immersed in suspension 58.

The operation of the apparatus 10 will now be described. The device is assembled as indicated in Fig. 1 with the conduit 40 engaged in the open end of tube 41. The electrode 50 is in position in tube 41 and stopcocks 13 and 16 are in closed positions. Container or vessel 57 containing the sample suspension 58 is brought up immersing the closed end 59 of the tube 41 in the suspension and positioning electrode 54 with its bottom end substantially adjacent the bottom end of tube 41. The arm 12 is connected to the external vacuum source and the stopcock 13 turned to open position allowing evacuation of air from the apparatus.

Upon evacuation of air, the air pressure inside the device will be substantially reduced as compared to the pressure of the atmosphere exerted on the system through open end 25. Evacuation of air is continued until this pressure differential results in the mercury 27 being drawn into the reservoir 26 such that the level of mercury in the section 21 is a short distance below the point of connection of arm 30 with said section 21, at which time stopcock 13 is turned to closed position. The mercury column extending from reservoir 26, through section 20 and connecting section 22 into section 21 to the point below arm 30 will now be in unbalanced condition by reason of the pressure differential between the pressure being exerted on the surface of the mercury in reservoir 27 and on the mercury in section 21 open to the atmosphere at 25.

At the same time, by reason of the air evacuation through arm 12, there will be a pressure differential between the pressure on the interior of tube 41 and the pressure exerted by the atmosphere on the surface of suspension 58 in container 57. By reason of this pressure differential, suspension 58 in container 57 will be drawn through aperture 47 into the tube 41. It is desired to fill the tube 41 and the Y-shaped section 11 all the way down to the surface of the mercury 27 in the reservoir 26, which could be done by regulating the exhaustion of air from the system by opening stopcock 13. However, this ordinarily would consume additional time and so we have provided the auxiliary stopcock 16 in arm 15. The open end 17 of arm 15 may be immersed in another container of the suspension 58 and the stopcock 16 turned to open position. By reason of the lower pressure in the portion 11, the suspension will be drawn through opening 17 into arm 15 until the entire system is filled with suspension up to the surface of the mercury in the reservoir 26. At this time, both stopcocks 13 and 16 are moved to closed positions.

The following condition then obtains. The column of mercury 27 by reason of its having being drawn up into the reservoir 26 under a condition of unbalance when air was exhausted from the device, will commence to recede from the level to which it was raised in reservoir 26. This level may be that indicated by the bubble level 60 on a wall of reservoir 26. Upon receding from level 60, the level of mercury in the section 21 will rise, until the mercury reaches the point of connection of arm 30 with section 21. Mercury then enters the arm 30 and passes over contact 32 energizing the starting device 38 to commence operation of the counter 39. As the mercury continues to recede in the reservoir 26, additional sample suspension 58 is drawn through aperture 47 into tube 41 to displace the volume of mercury having receded from level 60.

Receding of the mercury 27 in reservoir continues with the accompanying drawing of suspension through aperture 47. At the same time, the mercury will traverse arm 30, enter arm 29 and traverse said arm 29 until it passes over contact 31, which energizes the device 36 to stop counter 39. Devices 36 and 38 may be simple relays. As shown in Fig. 1, the level of the mercury in the reservoir 26 at the instant mercury passes over contact 32 to start the counter may be as indicated by the designation "$h$ start." The level of mercury in the reservoir 26 when the mercury passes over contact 31 to stop the counter 29 may be as indicated by the designation "$h$ stop." The volume of mercury which receded from the level "$h$ start" to the level "$h$ stop" will naturally be the same volume of mercury which traversed the horizontal section 28 from between contacts 31 and 32. Therefore, the length of section 28 from between contacts 31 and 32 is calibrated to establish a constant volume of mercury to be received therein between said points of contact corresponding to the volume of mercury receding from between points "$h$ start" and "$h$ stop."

By reason of the calibrated horizontal section 28 of the section 21 along which the mercury 27 passes after unbalance of the system, a substantially unchanging pressure differential is established in the device above the surface of the mercury in reservoir 26. This unchanging vacuum condition results in no loss or gain in volume of the suspension contained in the device by reason of any elasticity in the system such as would be occasioned by air bubbles or rubber tubing connections which may be employed during the measuring interval set by passage of mercury over contacts 31 and 32. This constant and unchanging vacuum condition in the system therefore enables calibration of the section from between contacts 31 and 32, such that during the interval from the instant the counter 39 is started to the time it is stopped by reason of the passage of mercury over contacts 31 and 32, a constant volume of suspension will be drawn through aperture 47. The value of the volume of suspension so drawn through aperture 47 will depend upon the drop in level from points "$h$ start"

to "$h$ stop" as indicated by the reference character "X" in Fig. 1. This volume of mercury will also be equal to that passing between contacts 31 and 32. We have determined that to meter one-half milliliter of suspension through aperture 47, the length of section 28 from between points 31 and 32 would be from 180 to 200 millimeters in length for one-half cubic centimeters of mercury. Once the volumetric calibration of the section 28 is established, the volume of suspension drawn through aperture 47 will remain substantially constant. Of course, other liquids may be suitable in place of mercury, whereupon the calibrations may be adjusted as needed.

It will be appreciated, of course, that upon starting of counter mechanism 39, suspension will be flowing through the aperture 47 and the particles therein then will be counted by the mechanism 39. In the embodiment shown, modulation of the electrical current path between electrodes 54 and 50 by particles is translated by the counter 39 into a count of particles for a given volume of suspension represented by the constant volume flowing through aperture 47 during the measuring interval. Other detecting systems could be employed as well, which would be operated during a measured interval by reason of the syphon and manometer system described which insures flow of a constant volume of suspension during the measuring interval relative to the scanning point of the detecting system. Where an electronic counter is employed, an oscilloscope may be provided for viewing pulses occasioned by modulation of the current path between the electrodes shown in Fig. 1.

Although the operation of the device 10 has been described in connection with use of an external vacuum source, it is contemplated that equally efficient operation may be attained by eliminating connection to such vacuum source and instead employing a bellows attached to end 25. This has not been shown, but will be easily understood and appreciated. For instance, a rubber bulb may be attached over open end 25 and the bulb employed as a hand pump in filling the reservoir 26 with mercury to lower the level of mercury in section 21 instead of the use of air evacuation means. When using the hand pump, stopcock 13 will remain closed, as will stopcock 16 until it is desired to fill the system with suspension. Such a bulb would also be useful for applying pressure to the system to clear the aperture 47 of debris.

It should be appreciated that the device is capable of a high order of repeatability. After a determination is made, it is not necessary to remove the suspension from the device entirely, in order to make another determination. All that has to be done is open stopcock 16 to remove a portion of the suspension, and then close stopcock 16, open stopcock 13 until the mercury is raised into the reservoir 26 to the level 60, close stopcock 13, open stopcock 16 to fill the system with suspension and commence the determination after stopcock 16 is again closed. The repeatability of the device also includes making a successive determination with a suspension of a different nature, since the amount of sample drawn through aperture 47 will be regulated by the drop in level of mercury in reservoir 26 and, therefore, will be constant for all samples.

It is believed the invention has been described in sufficient detail to enable same to be understood and practiced by the skilled artisan. Minor variations in the structure, arrangement and size of the various parts may occur to the skilled artisan without departing from the spirit or circumventing the scope of the invention as set forth in the appended claims.

We claim:

1. Fluid metering apparatus for starting and regulating flow of a suspension containing particles past the scanning means of a detecting system for studying said particles, said apparatus comprising a multi-branched hollow member having one branch closed at its free end and an inlet to the interior thereof adjacent said free end, a combination syphon and manometer comprising a vertically arranged mercury column having a first section connected to a second branch of said hollow member and a second section connected at one end thereof with said first section in a return formation with the second section opening to the atmosphere, said second section having a substantially horizontal section connected therewith spaced above said one end thereof, and means for causing an unbalanced substantially uniform pressure condition in the apparatus which causes the mercury to extend from a level in the first section to a point in the second section spaced below said horizontal section and the branches to be filled with suspension up to said level, the mercury thereafter receding from said level and traversing said horizontal section to cause a predetermined volume of suspension to flow through said inlet.

2. Fluid metering apparatus for starting and regulating flow of a suspension containing particles past the scanning means of a detecting system for studying said particles, said apparatus comprising a multi-branched hollow member having one branch closed at its free end and an inlet to the interior thereof adjacent said free end, a combination syphon and manometer comprising a vertically arranged mercury column having a first section connected to a second branch of said hollow member and a second section connected at one end thereof with said first section in a return formation with the second section opening to the atmosphere, said second section having a substantially horizontal section connected therewith spaced above said one end thereof, and means for causing an unbalanced substantially uniform pressure condition in the apparatus which causes the mercury to extend from a level in the first section to a point in the second section spaced below said horizontal section and the branches to be filled with suspension up to said level, the mercury thereafter receding from said level and traversing said horizontal section to cause a predetermined volume of suspension to flow through said inlet, said horizontal section having means electrically connected with the detecting system arranged to cause operation of the system for a predetermined interval of time upon contact with the mercury traversing said section, the duration of said interval being such as will permit a predetermined constant volume of suspension to flow through said inlet.

3. Apparatus as described in claim 2 in which said electrical means comprise spaced apart electrical contacts connected to start and stop operation of said detecting system, the portion of said horizontal section between said contacts being volumetrically calibrated such that said interval is related to volume of mercury traversing said portion.

4. Apparatus as described in claim 2 in which said pressure condition causing means comprises an air evacuation device connected to a third branch of said hollow member.

5. Apparatus as described in claim 2 in which said pressure condition causing means comprises an air evacuation device connected to a third branch of said hollow member, and air evacuation regulation and control means connected in said third branch.

6. Apparatus as described in claim 1 in which said hollow member has auxiliary inlet means for rapid filling of the apparatus upon initiation of said unbalanced pressure condition.

7. Metering apparatus comprising, a siphon having an internal fluid medium and two arms, a substantially horizontal conduit portion in one arm calibrated to meter an external liquid drawn into the second arm by differential pressure during siphoning action, the difference between the levels of fluid in the respective arms being substantially unchanged during siphoning action, whereby the differential pressure exerted during said change in level in said second arm is substantially constant.

8. Metering apparatus comprising, a siphon having an internal fluid medium and two arms, a substantially horizontal conduit portion in one arm calibrated to meter an external liquid drawn into the second arm by differential pressured during siphoning action, the change in level of said fluid medium in said one arm being substantially the same as to amount and direction as the change in level of the said second arm during siphoning action, whereby the differential pressure exerted during the change in level in said second arm is substantially constant.

9. Metering apparatus as claimed in claim 7 in which the siphon has electrical contacts adapted to be engaged by the fluid medium as it passes through the siphon to energize an electrical circuit, and at least one contact being in said horizontal conduit portion.

10. Metering apparatus comprising a siphon having a pair of arms connected by a continuous fluid conduit, a fluid siphoning medium extending between said arms through said conduit from vertically displaced levels whereby to constitute said arms respectively lower and higher fluid level arms, the higher fluid level arm adapted to be connected to a fluid system to be metered, a lateral extension in said lower fluid level arm having two metering points therein, the fluid in the higher fluid level arm adapted initially to be raised above the extension to create a siphoning head for exerting a pressure differential upon said system, said metering points adapted to be reached consecutively by said fluid medium as the said medium moves from said higher fluid level arm into said lower fluid level arm during siphoning action, the level of the first point reached being higher than the level of the second point reached by a distance substantially the same as the drop in level of the fluid medium in said higher fluid level arm, whereby to maintain said pressure differential substantially constant during the metering period.

11. Apparatus as claimed in claim 10 in which the higher level arm has a reservoir portion thereof of substantially greater diameter than that of said lateral extension and the initial level of said siphoning medium is at said reservoir portion whereby the drop in level during siphoning action is relatively small.

12. Apparatus as claimed in claim 10 in which vacuum means are provided for raising the level of the siphoning medium in the higher level arm to initiate the siphoning action.

13. Metering apparatus comprising a siphon having a pair of arms and an electrical conductive fluid therein as a siphon medium with the level of said fluid in one arm higher than the level of fluid in the second arm, a generally horizontal conduit in the second arm, a pair of metering points in said second arm arranged to be reached consecutively by said fluid medium during siphoning action and calibrated to measure a characteristic quantitatively related to the volume subtended between said points, the fluid in the higher fluid level arm being at a higher level than said horizontal conduit portion during siphoning action, the level of the first of said points reached during siphoning being above the level of the second of said points by a distance substantially the same as the drop in level of the fluid in said higher fluid level arm while the fluid is passing between said points, at least one of said points comprising an electrical contact, a second electrical contact in engagement with the fluid in said siphon, the movement of said fluid serving to complete an electrical circuit when said first contact is reached.

14. Apparatus according to claim 13 in which both of said points comprise electrical contacts, and the fluid closes two electrical circuits consecutively as it reaches said points, and said metering apparatus includes measuring means electrically operated by said circuits, one for turning the measuring means on and the other for turning it off.

15. A detecting system including apparatus for providing a predetermined response to movement of a first fluid and means for metering said first fluid from an open vessel to initiate said response comprising, a hollow body having an orifice adapted to be submerged in the vessel operably associated with said apparatus, said body containing a second fluid, means for applying suction on the interior of the body to said orifice to draw said first fluid through said orifice by movement of the second fluid, said body having means traversed by said second fluid which means are calibrated to measure the amount of suction applied in terms of volume of first fluid drawn through the orifice.

16. A detecting system including apparatus for providing a predetermined response to movement of a first fluid and means for metering said first fluid from an open vessel to initiate said response comprising, a hollow body having an orifice adapted to be submerged in the vessel operably associated with said apparatus, said body containing a second fluid, means for applying suction on the interior of the body to said orifice to draw said first fluid through said orifice by movement of the second fluid, said body having means traversed by said second fluid which means are calibrated to measure the amount of suction applied in terms of volume of first fluid drawn through the orifice, said last mentioned means having electrical contents arranged to be sequentially engaged by the second fluid in its said traversal simultaneously as said first fluid is drawn through said orifice to initiate said response.

17. A detecting system including apparatus for providing a predetermined response to movement of a first fluid and means for metering said first fluid from an open vessel to initiate said response comprising, a hollow body having an orifice adapted to be submerged in the vessel operably associated with said apparatus, said body containing a second fluid, means for applying suction on the interior of the body to said orifice to draw said first fluid through said orifice by movement of the second fluid, said body having means traversed by said second fluid which means are calibrated to measure the amount of suction applied in terms of volume of first fluid drawn through the orifice, said first mentioned means operative to cause movement of the two said fluids with accompanying substantially constant pressure on the interior of the body against the second fluid.

18. A detecting system including apparatus for providing a predetermined response to movement of a first fluid and means for metering said first fluid from an open vessel to initiate said response comprising, a hollow body having an orifice adapted to be submerged in the vessel operably associated with said apparatus, said body containing a second fluid, means for applying suction on the interior of the body to said orifice to draw said first fluid through said orifice by movement of the second fluid, said body having means traversed by said second fluid which means are calibrated to measure the amount of suction applied in terms of volume of first fluid drawn through the orifice, said last mentioned means having electrical contacts arranged to be sequentially engaged by the second fluid in its said traversal simultaneously as said first fluid is drawn through said orifice to initiate said response, said last mentioned means comprising a tortuous segment communicating with the body in offset relation therewith, said contacts being disposed in the segment vertically spaced one from the other.

References Cited in the file of this patent

UNITED STATES PATENTS

| | | |
|---|---|---|
| 2,250,784 | Tauscher | July 29, 1941 |
| 2,325,695 | McAfee | Aug. 3, 1943 |
| 2,505,905 | McAfee | May 2, 1950 |
| 2,656,508 | Coulter | Oct. 20, 1953 |
| 2,697,939 | Martin et al. | Dec. 28, 1954 |

FOREIGN PATENTS

| | | |
|---|---|---|
| 217,193 | Great Britain | Feb. 26, 1925 |
| 590,063 | France | Mar. 8, 1925 |